US006345493B1

(12) United States Patent
Smith et al.

(10) Patent No.: US 6,345,493 B1
(45) Date of Patent: Feb. 12, 2002

(54) AIR SEPARATION PROCESS AND SYSTEM WITH GAS TURBINE DRIVERS

(75) Inventors: Arthur Ramsden Smith, Telford; Donald Winston Woodward, New Tripoli, both of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/325,984

(22) Filed: Jun. 4, 1999

(51) Int. Cl.$^7$ ............................... F02C 13/10; F02G 3/00
(52) U.S. Cl. ............................................... 60/39.02
(58) Field of Search ..................... 60/39.02, 39.05, 60/39.55, 39.07

(56) References Cited

U.S. PATENT DOCUMENTS

| | | | |
|---|---|---|---|
| 3,731,495 A | 5/1973 | Coveney | 62/39 |
| 3,950,957 A | 4/1976 | Zakon | 62/30 |
| 4,019,314 A | 4/1977 | Springmann | 60/39.02 |
| 4,224,045 A | 9/1980 | Olszewski et al. | 62/30 |
| 4,250,704 A | 2/1981 | Bruckner et al. | 60/39.12 |
| 4,631,915 A | 12/1986 | Frewer et al. | 60/39.12 |
| 4,697,415 A | 10/1987 | Schiffers | 60/39.12 |
| 4,707,994 A | 11/1987 | Shenoy et al. | 62/11 |
| 4,729,217 A | 3/1988 | Kehihofer | 60/39.02 |
| 4,785,621 A | 11/1988 | Alderson et al. | 60/39.12 |
| 4,962,646 A | 10/1990 | Rathbone | 62/24 |
| 5,040,370 A | 8/1991 | Rathbone | 60/648 |
| 5,076,837 A | 12/1991 | Rathbone et al. | 75/433 |

(List continued on next page.)

FOREIGN PATENT DOCUMENTS

| | | |
|---|---|---|
| DE | 19529681 | 2/1997 |
| EP | 845644 A2 | 6/1998 |
| GB | 1455960 | 11/1996 |

OTHER PUBLICATIONS

Allam, R. J., et al., "Future Direction of Air Separation Design for Gasification, IGCC and Alternative Fuel Projects", *Gasification–The Gateway to a Cleaner Future*, Ichem Conference, Sep. 23–24, 1998, Dresden, Germany.
Smith, A. R., et al., "Next–Generation Integration Concepts for Air Separation Units and Gas Turbines", *Journal of Engineering for Gas Turbines and Power*, Apr. 1997, vol. 119, pp 298–304.
Smith, A. R., et al., "Integration of Oxygen Plants and Gas Turbines in IGCC Facilities", Presented at the American Power Conference 58$^{th}$ Annual Meeting, Apr. 9–11, 1996, Chicago, IL.
U.S. application No. 08/996,556, Smith et al., filed Dec. 23, 1997.
U.S. application No. 09/083,219, Smith et al., filed May 22, 1998.

*Primary Examiner*—Timothy S. Thorpe
*Assistant Examiner*—William Rodriguez
(74) *Attorney, Agent, or Firm*—John M. Fernbacher

(57) ABSTRACT

An integrated gas turbine and air separation process and system having an air separation unit integrated with a gas turbine-driven air compression system which operates using fuel as the primary energy source. Feed air for the air separation unit is provided by two separate compressors driven by the gas turbine expander wherein one compressor provides air to the air separation unit and to the gas turbine combustor, and the other compressor provides feed air to the air separation unit. The ability to control an integrated air separation/gas turbine process during off-design or turn-down conditions is improved by the use of two air compressors in the present invention compared with the usual single compressor gas turbine system. In the design of the integrated gas turbine and air separation system, the power requirement for a given air compression duty can be matched more readily to the power output of an available expansion turbine when two air compressors are used rather than a single air compressor.

16 Claims, 2 Drawing Sheets

U.S. PATENT DOCUMENTS

| | | | |
|---|---|---|---|
| 5,081,845 A | 1/1992 | Allam et al. ................... | 62/24 |
| 5,251,450 A | 10/1993 | Agrawal et al. ............... | 62/25 |
| 5,251,451 A | 10/1993 | Xu et al. ....................... | 62/25 |
| 5,257,504 A | 11/1993 | Agrawal et al. ............... | 62/24 |
| 5,295,350 A * | 3/1994 | Child et al. ................. | 60/39.02 |
| 5,317,862 A | 6/1994 | Rathbone ................... | 60/39.05 |
| 5,388,395 A | 2/1995 | Scharpf et al. ............ | 60/39.02 |
| 5,406,786 A | 4/1995 | Scharpf et al. ............ | 60/39.05 |
| 5,410,869 A | 5/1995 | Muller ....................... | 60/39.02 |
| 5,421,166 A | 6/1995 | Allam et al. ................... | 62/24 |
| 5,437,150 A | 8/1995 | Latham et al. ............. | 60/39.02 |
| 5,459,994 A | 10/1995 | Drnevich .................... | 60/39.02 |
| 5,666,800 A * | 9/1997 | Sorensen .................... | 60/39.02 |
| 5,666,823 A | 9/1997 | Smith et al. .................. | 62/646 |
| 5,722,259 A | 3/1998 | Sorensen et al. ............. | 62/646 |
| 5,740,673 A | 4/1998 | Smith et al. ................ | 60/39.02 |

* cited by examiner

AIR SEPARATION PROCESS AND SYSTEM WITH GAS TURBINE DRIVERS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Gas turbines and cryogenic air separation processes can be integrated in highly efficient systems for the production of atmospheric gas products. Such systems also can be used to generate electric power in which the gas turbine/air separation system is integrated with a gasification process to generate fuel gas for the gas turbine by the gasification of coal using oxygen from the air separation process. These power generation processes are known as integrated gasification combined cycle (IGCC) processes in which the gas turbine drives an electric generator and the gas turbine exhaust is used to generate steam for a steam turbine which drives another electric generator. In the production of oxygen and/or nitrogen, the pressurized air feed for the cryogenic air separation process can be provided partly or completely by the gas turbine compressor. In both IGCC and air separation systems, nitrogen from the air separation process can be introduced into the gas turbine combustor for additional energy recovery and control of $NO_x$ formation, or the nitrogen can be work expanded to drive other process compressors or generate additional electric power.

Comprehensive reviews of integration methods for gas turbines and air separation systems are given in a paper entitled "Next-Generation Integration Concepts for Air Separation Units and Gas Turbines" by A. R. Smith et al in *Transactions of the ASME*, Vol. 119, Apr. 1997, pp. 298–304 and in a presentation entitled "Future Direction of Air Separation Design for Gasification, IGCC, and Alternative Fuel Projects" by R. J. Allam et al, IChem$^E$ Conference on Gasification, 23–24 Sep. 1998, Dresden, Germany.

A common mode of integration between the gas turbine and air separation units is defined as full air and nitrogen integration. In this operating mode, all air for the gas turbine combustor and the air separation unit is provided by the gas turbine air compressor which is driven by the gas turbine expander, and nitrogen from the air separation unit is utilized in the integrated system. Full air and nitrogen integration is described in representative U.S. Pat. Nos. 3,731,495, 4,224,045, 4,250,704, 4,631,915, and 5,406,786, wherein the nitrogen is introduced into the gas turbine combustor. Full air and nitrogen integration also is described in U.S. Pat. Nos. 4,019,314 and 5,317,862, and in German Patent Publication DE 195 29 681 A1, wherein the nitrogen is work expanded to provide work of compression for the air feed or to generate electric power.

The gas turbine and air separation unit can operate in an alternative mode, defined as partial air integration with full nitrogen integration, in which a portion of the air feed for the air separation unit is provided by the gas turbine compressor and the remainder is provided by a separate air compressor driven by an independent power source. Nitrogen for the air separation unit is introduced into the gas turbine combustor or is otherwise work expanded. This operating mode is described in representative U.S. Pat. Nos. 4,697,415; 4,707,994; 4,785,621; 4,962,646; 5,437,150; 5,666,823; and 5,740,673.

In another alternative, nitrogen integration is used without air integration. In this alternative, the gas turbine and air separation unit each has an independently-driven air compressor, and the nitrogen from the air separation unit is used in the gas turbine combustor. This option is described in representative U.S. Pat. Nos. 4,729,217; 5,081,845; 5,410,869; 5,421,166; 5,459,994; and 5,722,259.

U.S. Pat. No. 3,950,957 and Great Britain Patent Specification 1 455 960 describe an air separation unit integrated with a steam generation system in which a nitrogen-rich waste stream is heated by indirect heat exchange with hot compressed air from the air separation unit main air compressor, the heated nitrogen-rich stream is further heated indirectly in a fired heater, and the final hot nitrogen-rich stream is work expanded in a dedicated nitrogen expansion turbine. The work generated by this expansion turbine drives the air separation unit main air compressor. The nitrogen expansion turbine exhaust and the combustion gases from the fired heater are introduced separately into a fired steam generator to raise steam, a portion of which may be expanded in a steam turbine to drive the air separation unit main air compressor. Optionally, the combustion gases from the fired heater are expanded in a turbine which drives a compressor to provide combustion air to a separate fired heater which heats the nitrogen-rich stream prior to expansion.

An alternative use for high pressure nitrogen from an air separation unit integrated with a gas turbine is disclosed in U.S. Pat. No. 5,388,395 wherein the nitrogen is work expanded to operate an electric generator. The cold nitrogen exhaust from the expander is mixed with the inlet air to the gas turbine compressor thereby cooling the total compressor inlet stream. Alternatively, low pressure nitrogen from the air separation unit is chilled and saturated with water in a direct contact cooler-chiller, and the chilled, saturated nitrogen is mixed with the inlet air to the gas turbine compressor.

U.S. Pat. Nos. 5,040,370 and 5,076,837 disclose the integration of an air separation unit with high-temperature processes which use oxygen, wherein waste heat from the process is used to heat pressurized nitrogen from the air separation unit, and the hot nitrogen is work expanded to generate electric power.

European Patent Publication EP 0 845 644 A2 describes an elevated pressure air separation unit in which the pressurized nitrogen-rich product is heated indirectly by the combustion of low pressure fuel, and the hot nitrogen is work expanded to produce power or drive gas compressors within the air separation unit.

In the production of oxygen in remote areas without accessible electric power grids, feed air compression for an air separation unit can be provided by gas turbine drivers if sufficient fuel is available. In remote areas having industrial operations which require oxygen, inexpensive natural gas often is available and can be used as gas turbine fuel. Industrial operations in such remote areas typically pay a premium for purchased equipment, and therefore simple, reliable equipment is preferred.

An air separation plant integrated with a gas turbine, whether it operates in a remote area or in a populated industrialized area, is subject to various off-design conditions or periods during which the plant operates at lower efficiency or below the design oxygen production rate. These periods occur due to changes in ambient air temperature and/or the cyclic demand for oxygen product. The equipment selection and process design of an integrated air separation plant/gas turbine system therefore must address steady-state operation at design capacity as well as operation at off-design or turndown conditions. This can be difficult to achieve in plants designed for operation in remote locations, particularly in plants with total air integration, because the need for simplified equipment can reduce the number of operating alternatives or degrees of freedom needed for efficient operation at off-design conditions.

The invention disclosed below and defined by the claims which follow addresses the need for improved designs and methods of operation for integrated air separation plant/gas turbine systems, particularly for the operation of such systems in remote areas at off-design or turndown conditions.

BRIEF SUMMARY OF THE INVENTION

The invention is a method for the separation of air which comprises (a) compressing ambient air in a first air compressor to provide a first and a second hot pressurized air feed stream; (b) compressing ambient air in a second air compressor to provide a third hot pressurized air feed stream; (c) combusting fuel with the first hot pressurized air feed stream in a gas turbine combustor, withdrawing therefrom a hot pressurized gas, work expanding the hot pressurized gas in a gas turbine expander, and withdrawing therefrom a gas turbine expander exhaust gas, wherein work produced by the gas turbine expander provides at least a portion of the work required to drive the first and second air compressors; (d) combining the second and third hot pressurized air feed streams, cooling the resulting combined hot pressurized air feed stream, and separating the resulting cooled pressurized air feed stream in an air separation system to yield an oxygen-rich product gas and a nitrogen-rich product gas; and (e) heating and work expanding the nitrogen-rich product gas to yield shaft work and a cooled nitrogen-rich product gas.

Cooling of the resulting combined hot pressurized air feed stream in (d) can be provided at least in part by indirect heat exchange with the nitrogen-rich product gas of (d) and the cooled nitrogen-rich product gas of (e). The method also can further comprise generating steam by indirect heat exchange of the gas turbine expander exhaust gas with water, and introducing the steam into the gas turbine combustor.

The invention can further comprise (f) heating the cooled nitrogen-rich product gas to provide a hot nitrogen-rich product gas, generating steam by indirect heat exchange of the hot nitrogen-rich product gas with water, and introducing the steam into the gas turbine combustor.

The invention can further comprise the combination of (1) heating the cooled nitrogen-rich product gas to provide a hot nitrogen-rich product gas, generating steam by indirect heat exchange of the hot nitrogen-rich product gas with water, and introducing the steam into the gas turbine combustor, and (2) generating steam by indirect heat exchange of the gas turbine expander exhaust gas with water, and introducing the steam into the gas turbine combustor. In addition, if desired, liquid water can be introduced directly into the gas turbine combustor.

The shaft work from work expanding the nitrogen-rich product gas in (e) can be utilized to compress the oxygen-rich product gas.

The cooling of the resulting combined hot pressurized air feed stream in (d) can be provided at least in part by indirect heat exchange with the nitrogen-rich product gas of (d) to yield the hot nitrogen-rich product gas of (f).

In a first alternative embodiment, the invention can further comprise (1) compressing air in a third air compressor to provide a fourth and a fifth hot pressurized air feed stream; and (2) combusting fuel with the fourth hot pressurized air feed stream in an additional gas turbine combustor, withdrawing therefrom an additional hot pressurized gas, expanding the additional hot pressurized gas in an additional gas turbine expander, and withdrawing therefrom an additional gas turbine expander exhaust gas, wherein work produced by the additional expansion turbine is used to compress the oxygen-rich product gas of (d). Steam can be generated by indirect heat exchange of the additional gas turbine expander exhaust gas with water, and the steam can be introduced into the gas turbine combustor of (c). The fifth hot pressurized air feed stream can be combined with the resulting combined hot pressurized air feed stream of (d).

In a second alternative embodiment, the invention can further comprise (1) compressing air in a third air compressor to provide a fourth and a fifth hot pressurized air feed stream; and (2) combusting fuel with the fourth hot pressurized air feed stream in an additional gas turbine combustor, withdrawing therefrom an additional hot pressurized gas, expanding the additional hot pressurized gas in an additional gas turbine expander, and withdrawing therefrom an additional gas turbine expander exhaust gas, wherein work produced by the additional expansion turbine is used to compress the nitrogen-rich product gas of (d). In this alternative embodiment, steam can be generated by indirect heat exchange of the additional gas turbine expander exhaust gas with water, and the steam can be introduced into the gas turbine combustor of (c). The fifth hot pressurized air feed stream can be combined if desired with the resulting combined hot pressurized air feed stream of (d).

In one operating mode of the invention, the temperature of the ambient air increases, thereby decreasing the combined mass flow rate of the first and second hot pressurized air feed streams in (a) and decreasing the mass flow of the third hot pressurized air feed streams in (a). In response to the increase in ambient air temperature, the mass flow rate of the second hot pressurized air feed stream of (a) can be increased such that the mass flow rate of the resulting combined pressurized air feed stream of (d) remains constant. In addition, the mass flow rate of the fuel in (c) can be increased and the mass flow rate of the steam to the gas turbine combustor in (f) can be increased.

In another operating mode of the invention, the temperature of the ambient air increases, thereby decreasing the combined mass flow rate of the first and second hot pressurized air feed streams in (a) and decreasing the mass flow of the third hot pressurized air feed streams in (a). In response to the increase in ambient air temperature, the mass flow rate of the second hot pressurized air feed stream of (a) can be increased such that the mass flow rate of the resulting combined pressurized air feed stream of (d) remains constant. In addition, the mass flow rate of the fuel in (c) can be increased and the mass flow rate of the liquid water to the gas turbine combustor can be increased.

The invention also includes an apparatus for the separation of air which comprises:

(a) a first air compressor to compress ambient air, thereby providing a first and a second hot pressurized air feed stream;

(b) a second air compressor to compress ambient air, thereby providing a third hot pressurized air feed stream;

(c) a gas turbine combustor for combusting fuel with the first hot pressurized air feed stream to yield a hot pressurized gas and a gas turbine expander for work expanding the hot pressurized gas to yield a gas turbine expander exhaust gas, wherein the gas turbine expander is mechanically linked with the first and second air compressors such that work from the gas turbine expander drives the first and second air compressors;

(d) piping means for flow of the first hot pressurized air feed stream from the first air compressor to the gas turbine combustor and for flow of the hot pressurized gas from the gas turbine combustor to the a gas turbine expander;

(e) piping means for combining the second and third hot pressurized air feed streams and providing a resulting combined hot pressurized air feed stream;

(f) cooling means to cool the resulting combined hot pressurized air feed stream to provide a cooled pressurized air feed stream;

(g) an air separation system to separate the resulting cooled pressurized air feed stream into an oxygen-rich product gas and a nitrogen-rich product gas; and (h) piping means for flow of the cooled pressurized air feed stream from the cooling means to the air separation system.

DETAILED DESCRIPTION OF THE INVENTION

The invention is a method of producing oxygen using an air separation unit integrated with a gas turbine-driven air compression system which operates using fuel as the primary energy source. The system utilizes only expansion turbine-driven compressors, and is particularly useful in remote locations where a fuel such as natural gas is plentiful, capital costs must be minimized, and electric power is not readily available for import. All feed air for the air separation unit is provided by two separate compressors driven by the gas turbine expander wherein one compressor provides air to the air separation unit and to the gas turbine combustor, and the other compressor provides feed air to the air separation unit. In the following description, the generic term "gas turbine" includes the air compressor, the combustor, and the expander or expansion turbine which are all part of the gas turbine system.

Figure 1:
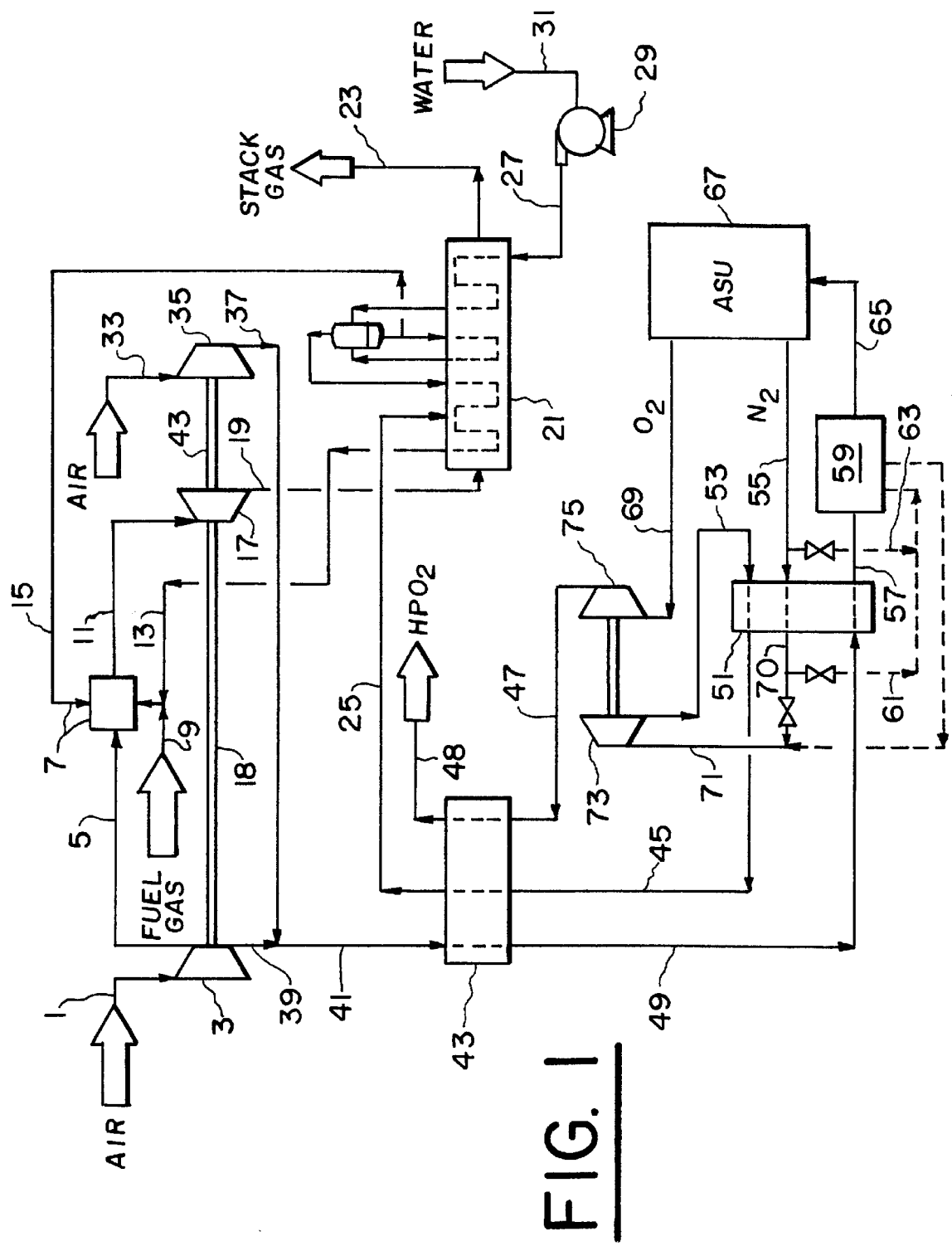
FIG. 1 is a schematic process flowsheet for an embodiment of the present invention.

An embodiment of the invention is illustrated in FIG. 1. Ambient air as air stream 1 is compressed in compressor 3, preferably an adiabatic compressor, to 48–590 psia and 300–1200° F. Ambient air is defined as atmospheric air present at the suction of compressor 3. Two portions of compressed air are withdrawn from the compressor. Both portions can be withdrawn at the same pressure from the compressor discharge, or alternatively one portion can be withdrawn from an intermediate stage at a lower pressure and the other withdrawn from the compressor discharge. First compressed air stream 5 is combusted in gas turbine combustor 7 with fuel stream 9 to produce hot pressurized combustion gas stream 11. Steam in line 13, the source of which is later defined, can be introduced into combustor 7 to moderate the combustion reactions. Alternatively, liquid water via line 15 can be introduced into combustor 7, either alone or with steam stream 13, to moderate the combustion reactions. Typically the fuel stream 9 is natural gas.

Hot pressurized combustion gas stream 11 is work expanded in gas turbine expander 17 to produce gas turbine exhaust stream 19 at near atmospheric pressure and 300 to 1600° F. Gas turbine expander 17 is a high-temperature turboexpander of any type known in the art. Exhaust stream 19 can be introduced into heat recovery steam generator (HSRG) 21 wherein steam is generated by indirect heat transfer with boiling water and/or superheated steam to provide steam as stream 13, which can be used in combustor 7 as earlier described. Gas turbine expander 17 is linked via shaft 18 and drives compressor 3.

Heat recovery steam generator 21 is of the type commonly used for gas turbine exhaust heat recovery in combined cycle power generation systems. A heat recovery steam generator comprises one or more tube circuits containing water, steam or mixtures of the two phases flowing in the inner or tube side of each circuit. The tube circuits are installed in a near-atmospheric pressure enclosure through which the hot exhaust gases from the gas turbine expander flow on the outer sides of the tubes. Water enters the inner side or tube side of a tube circuit at the cold end of the device and is progressively heated, vaporized, and optionally superheated by absorbing the heat contained in the gas turbine expander exhaust. Cooled gas turbine exhaust is discharged in stack gas 23 to the atmosphere.

Partially cooled gas turbine exhaust in heat recovery steam generator 21 may be combined with hot nitrogen-rich gas stream 25 (later defined) within the heat recovery steam generator, preferably at a location where the temperatures of the gas turbine exhaust and the hot nitrogen-rich gas are equal or nearly equal. The combined stream of combustion products and nitrogen flows through heat recovery steam generator 21 in which it is further cooled by indirect heat transfer with vaporizing water and/or superheated steam. The completely vaporized water as saturated or superheated steam provides the steam as stream 13 earlier described. The resulting cooled mixed gas from the steam generator is discharged to the atmosphere as stack gas 23. Pressurized boiler feed water 27 is provided by pump 29 from low pressure boiler feed water 31. Boiler feed water 31 may be a waste stream which contains combustible organic contaminants, for example wastewater from a Fischer-Tropsch hydrocarbon synthesis process.

Ambient air as additional air stream 33 is compressed in compressor 35, preferably an adiabatic compressor, to 48–590 psia and 300–1200° F. Ambient air is defined as atmospheric air present at the suction of compressor 35. Additional compressed air stream 37 is combined with second compressed air stream 39, alternatively described as extracted air stream 39, from compressor 3 to yield total compressed air feed stream 41 at 48–590 psia and 300–1200° F. Compressor 35 is driven by gas turbine expander 17 via shaft 43.

Compressors 3 and 35 preferably are fitted with adjustable inlet guide vanes which allow control of the compressor output as ambient temperatures and other environmental parameters vary. As an example, compressor 35 guide vanes would be adjusted to maintain constant gas flow of air stream 41 as ambient temperatures change. Guide vane adjustment compensates for the change in ambient air density as temperature varies.

Total compressed air feed stream 41 is cooled indirectly in heat exchanger 43 against either or both gas streams 45 and 47 (later defined) to yield intermediate cooled air feed stream 49 having a temperature of about 180 to 800° F. Intermediate cooled air feed stream 49 is further cooled, typically to near ambient temperature, in heat exchanger 51 against either or both nitrogen-rich product streams 53 and 55 (later defined).

Cooled feed air stream 57 is treated in contaminant removal system 59, typically a thermal swing adsorption (TSA) process, to remove water, carbon dioxide, and other impurities before the feed air flows to the air separation system. In the well-known TSA method, alternating adsorber vessels are taken offstream for regeneration to remove adsorbed contaminants by heating the adsorber, purging with a dry purge gas, and then cooling the adsorber to operating temperature before placing the regenerated adsorber back onstream. Heating and purging of an adsorber vessel can be provided at least in part by hot nitrogen-rich product stream 61 (later defined), which has been heated to 180–600° F. in heat exchanger 51, and the cooling of the adsorber vessel can be provided by purging with portion 63 of nitrogen-rich product stream 55, which is at near ambient temperature. Alternatively, contaminant removal system 59 can be a pressure swing adsorption (PSA) process. This process does not require hot regeneration gas, but does require an ambient temperature purge gas, and this purge gas can be provided by portion 63 of nitrogen-rich product stream 55.

Cooled and contaminant-free pressurized air feed stream 65 then passes into air separation system 67, preferably a cryogenic air separation system, where it is separated into nitrogen-rich product stream 55 and oxygen-rich product stream 69. The term "oxygen-rich" as used herein refers to any gas stream having a higher oxygen concentration than air and the term "nitrogen-rich" as used herein refers to any gas stream having a higher nitrogen concentration than air. Nitrogen-rich product stream 55 typically contains 80 to 99.999 mole % nitrogen and typically is at near ambient temperature and a pressure of 15 to 590 psia. Oxygen-rich product stream 69 typically contains 50 to 99.9 mole % oxygen and typically is at near ambient temperature and a pressure of 15 to 1200 psia.

Air separation system 67 can be an elevated pressure (EP) cryogenic air separation process in which feed air at a pressure above about 100 psia is separated into oxygen-rich and nitrogen-rich streams at pressures above atmospheric. In this well-known method, cooled pressurized air feed stream 65 is further cooled, at least partially condensed, and distilled in one or more distillation columns. Refrigeration typically is provided by work expansion of one or more of the internal process streams. Preferably, air separation system 67 operates completely on cooled pressurized air feed stream 65 and no external refrigeration or additional compression is required. Representative EP air separation systems are described in U.S. Pat. Nos. 5,740,673, 5,666,823, and 5,421,166. Air separation system 67 alternatively can be a low pressure cryogenic air separation process in which a portion of the feed air is separated into oxygen-rich and nitrogen-rich streams at pressures above atmospheric.

Alternatively, other types of air separation processes known in the art can be used in air separation system 67. Examples include pressure swing adsorption or polymeric membrane permeation processes. These well-known methods operate on a pressurized air feed and utilize the differential between the air feed pressure and a lower pressure product stream (typically near atmospheric pressure) to provide the driving force for separation. These processes typically operate at ambient or near-ambient temperatures, so that cooled pressurized air feed stream 65 would be at near-ambient temperature.

Nitrogen-rich product stream 55 optionally provides gas stream 63 earlier described. Nitrogen-rich gas stream 55 can be heated by indirect heat transfer against intermediate cooled air feed stream 49 in heat exchanger 51 to yield intermediate heated nitrogen-rich stream 70, which optionally provides hot nitrogen-rich product stream 61 earlier described. Nitrogen-rich stream 71 can be work-expanded in turboexpander 73 to near atmospheric pressure to drive compressor 75 for compression of oxygen-rich product stream 69 to yield compressed oxygen-rich product stream 47. Compressed oxygen stream 47 can be heated in heat exchanger 43 to yield hot oxygen product stream 48, which can be utilized for example in the partial oxidation of hydrocarbons to generate synthesis gas.

Expanded nitrogen-rich product stream 53, now at a temperature between near ambient temperature and 800° F. and a pressure less than about 22 psia, is heated in heat exchanger 51 against intermediate cooled air feed stream 49 as earlier described. Warmed nitrogen-rich product stream 45 can be further heated in heat exchanger 43 against total compressed air feed stream 41 as earlier described, wherein the resulting hot nitrogen-rich product stream 25 approaches the temperature of total compressed air feed stream 41.

This preferred embodiment of the invention as illustrated by FIG. 1 provides improved flexibility in the design and operation of the integrated air separation/gas turbine system. Second air compressor 35, which is driven by expansion turbine 17 together with air compressor 3, provides this flexibility. Because air compressor 3 supplies air for both the gas turbine combustor and air separation systems, the selection of a single properly-sized air compressor and expansion turbine from standard commercially-available units may require that one of these units be oversized relative to the other. Large air compressors require large expansion turbines, and large expansion turbines are often available only in a single-shaft configuration, which is less flexible in operation compared with smaller double-shafted expansion turbines. Air compressor 3 could require an oversized expansion turbine if the actual power requirements of a standard air compressor fell between the rated power outputs of commercially available expansion turbines. An oversized expansion turbine operating below design capacity operates inefficiently, and this is obviously undesirable. By using two compressors according to the present invention, a smaller standard expansion turbine could be selected which would operate closer to 100% of its design capacity, thus operating most efficiently. Stated alternatively, the power requirement for a given air compression duty can be matched more readily to the power output of an available expansion turbine when two air compressors are used rather than a single air compressor.

The ability to control an integrated air separation/gas turbine process during off-design or turndown conditions is improved by the use of two air compressors in the present invention compared with the usual single compressor gas turbine system. The most common off-design situation for an integrated air separation/gas turbine process occurs when the ambient air temperature deviates from the design temperature, particularly when it is higher than the design temperature. As ambient temperature increases, the mass flow of the compressor discharge will decrease as the density of the compressor suction air decreases. In order to maintain a constant mass flow of air to the air separation unit and thereby maintain the oxygen product rate, adjustments can be made to the fraction of air taken from compressor 3 to the air separation unit, the inlet guide vane setting on compressors 3 and 35, and the firing rate of combustor 7. This is illustrated in the Example given below.

Figure 2:
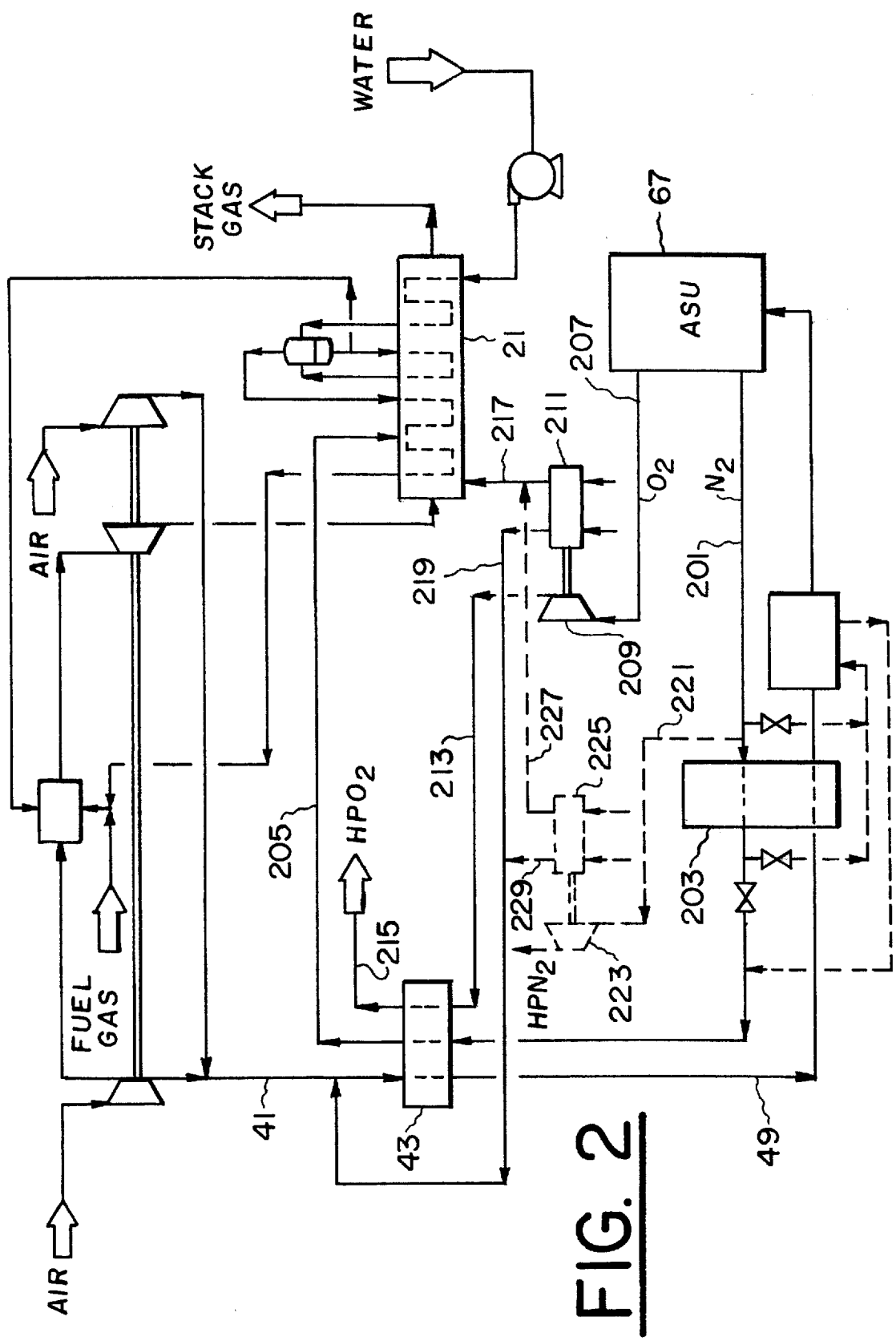
FIG. 2 is a schematic process flowsheet for an alternative embodiment of the present invention.

An alternative embodiment of the invention is illustrated in FIG. 2. In this alternative, air separation system 67 can be any type of cryogenic air separation system known in the art, for example an elevated pressure or low pressure system as earlier described. Nitrogen-rich product stream 201 is not work expanded; instead, the stream is utilized in heat exchanger 203 to further cool intermediate cooled air feed stream 49 and in heat exchanger 43 to cool compressed air feed stream 41. The resulting hot nitrogen-rich product stream 205 can be utilized in heat recovery steam generator 21 as earlier described.

Oxygen-rich product stream 207, which can be at a pressure of 15 to 1200 psia, typically requires additional compression and this can be accomplished in compressor 209 which is driven by gas turbine system 211. Compressed oxygen-rich product stream 213 can be heated in heat exchanger 43 to cool compressed air feed stream 41 and yield hot pressurized oxygen-rich product stream 215. In this case, gas turbine expander exhaust gas 217 can be used in heat recovery steam generator 21 to produce additional steam for use as described earlier. A portion of the compressed air from the gas turbine compressor of gas turbine system 211 can be withdrawn as compressed air stream 219 and combined with compressed air feed stream 41 to provide additional compressed air feed for air separation system 67.

If a high pressure nitrogen-rich product is needed, stream 221 can be withdrawn as a portion of nitrogen-rich product stream 201 and compressed in compressor 223 which is driven by gas turbine system 225. In this case, gas turbine expander exhaust gas 227 can be used in heat recovery steam generator 21 to produce additional steam for use as earlier described. A portion of the compressed air from the gas turbine compressor of gas turbine system 225 can be withdrawn as compressed air stream 229 and combined with compressed air feed stream 41 to provide additional compressed air feed for air separation system 67.

Several operating alternatives are possible with the two embodiments of the invention described above. Some of the nitrogen product from air separation unit 67 can be compressed and introduced into combustor 7, and some or all of the steam generated in heat recovery steam generator 21 can be expanded in a steam turbine to drive another compressor or to generate electric power. Oxygen product streams 48 or 215 can be heated in heat recovery steam generator 21. The gas turbine can be sized to drive an electric generator in addition to the two air compressors 3 and 35. If a pumped LOX air separation cycle is used, oxygen compression would not be required and the high pressure nitrogen expansion work from expander 73 could be used to drive a feed air compressor. Heat recovery steam generator 21 might not be used in order to simplify the equipment requirements.

EXAMPLE

The integrated air separation/gas turbine system of FIG. 1 was simulated by heat and material balances for a system producing 1,000 tons/day of 95 mole % oxygen at about 192 psia. The process was simulated at an ambient air temperature of 59° F., and a stream summary for the simulation is given in Table 1.

TABLE 1

STREAM SUMMARY FOR EXAMPLE
Ambient air temperature = 59° F.

| STREAM NO. | TEMP (° F.) | PRESS (psia) | FLOW (lb/sec) | COMPOSITION (mole %) | | | | |
|---|---|---|---|---|---|---|---|---|
| | | | | $CH_4$ | $N_2 + Ar$ | $O_2$ | $CO_2$ | $H_2O$ |
| 1 | 59 | 14.7 | 88.0 | | 78.22 | 20.74 | 0.03 | 1.01 |
| 9 | 670 | 259.2 | 1.58 | 100.00 | | | | |
| 13 | 670 | 340.0 | 15.6 | | | | | 100.00 |
| 19 | 968 | 15.1 | 85.7 | | 55.66 | 8.88 | 2.96 | 32.50 |
| 23 | 366 | 14.7 | 155.2 | | 74.05 | 5.51 | 1.71 | 18.73 |
| 25 | 650 | 15.1 | 69.5 | | 98.69 | 1.00 | 0.04 | 0.27 |
| 27 | 285 | 372.0 | 15.6 | | | | | 100.00 |
| 33 | 59 | 14.7 | 77.9 | | 78.22 | 20.74 | 0.03 | 1.01 |
| 37 | 686 | 192.1 | 77.9 | | 78.22 | 20.74 | 0.03 | 1.01 |
| 39 | 686 | 192.1 | 19.5 | | 78.22 | 20.74 | 0.03 | 1.01 |
| 48 | 650 | 721.0 | 23.2 | | 5.00 | 95.00 | | |

Next, the process was simulated for an ambient air temperature of 90° F., and a stream summary at this higher temperature is given in Table 2.

TABLE 2

STREAM SUMMARY FOR EXAMPLE
Ambient air temperature = 90° F.

| STREAM NO. | TEMP (° F.) | PRESS (psia) | FLOW (lb/sec) | COMPOSITION (mole %) | | | | |
|---|---|---|---|---|---|---|---|---|
| | | | | $CH_4$ | $N_2 + Ar$ | $O_2$ | $CO_2$ | $H_2O$ |
| 1 | 90 | 14.7 | 86.0 | | 76.77 | 20.35 | 0.03 | 2.85 |
| 9 | 850 | 259.9 | 1.63 | 100.00 | | | | |
| 13 | 850 | 340.0 | 16.8 | | | | | 100.00 |
| 19 | 1067 | 15.1 | 82.9 | | 52.63 | 7.79 | 3.10 | 36.48 |
| 23 | 411 | 14.7 | 152.4 | | 72.41 | 4.86 | 1.78 | 20.95 |
| 25 | 700 | 15.1 | 69.5 | | 98.45 | 1.00 | 0.04 | 0.51 |

TABLE 2-continued

STREAM SUMMARY FOR EXAMPLE
Ambient air temperature = 90° F.

| STREAM NO. | TEMP (° F.) | PRESS (psia) | FLOW (lb/sec) | COMPOSITION (mole %) | | | | |
|---|---|---|---|---|---|---|---|---|
| | | | | $CH_4$ | $N_2 + Ar$ | $O_2$ | $CO_2$ | $H_2O$ |
| 27 | 185 | 372.0 | 16.8 | | | | | 100.00 |
| 33 | 90 | 14.7 | 75.9 | | 76.77 | 20.35 | 0.03 | 2.85 |
| 37 | 745 | 192.5 | 75.9 | | 76.77 | 20.35 | 0.03 | 2.85 |
| 39 | 745 | 192.5 | 21.5 | | 76.77 | 20.35 | 0.03 | 2.85 |
| 48 | 700 | 638.0 | 23.2 | 5.00 | 95.00 | | | |

Due to the increase in ambient temperature, the mass throughput of compressor 3 (the gas turbine compressor) drops by 2.3% and the mass throughput of compressor 35 (the air seperation unit compressor) drops by 2.6%. In order to maintain the flow of oxygen product stream 48 at 23.2 lb/sec, the feed air flow in total compressed air feed stream 41 is maintained by increasing the flow of extracted air stream 39 to compensate for the decrease in flow of compressor 35. This decreases the air flow to gas turbine combustor 7, which is compensated for by increasing the flow of fuel stream 9 and stream stream 13 to combustor 7. This compensation increases the mass flow of motive gas to gas turbine expander 17, which in turn enables the expander to produce the shaft work necessary to drive compressors 3 and 35. This Example thus illustrates the utility of the present invention to compensate for off-design operation which can occur with increasing ambient air temperature.

Alternatively, compressor 35 might be sized to operate at a turndown condition for full oxygen production rates at normal ambient temperatures. As ambient air temperature increases, the guide vane setting of compressor 35 would be adjusted to permit compression of additional air to compensate for a decrease in the mass flow through compressor 3. In this way, combustor 7 would operate at more constant air/fuel ratios regardless of the ambient air temperature.

As oxygen demand is changed at constant air temperature, guide vane adjustments of compressor 35 would be controlled as previously described to accommodate the change in mass air flow demand in line 41.

The firing temperature in combustor 7 can be maintained at a nearly constant level by controlling flow of air stream 5 using the guide vanes on compressors 3 and 35, and by varying the flow of steam stream 13 and water stream 15. If steam production in stream 13 is constrained by the mass flow and temperature of gas turbine exhaust stream 19, water stream 15 can be particularly useful in enabling the production of more power in expander 17 without requiring a change in firing temperature of combustor 7. Water stream 15 can be varied to make up any shortfall in the combined flows of streams 5 and 13 at a fixed power output requirement of expansion turbine 17.

Thus the present invention provides a method of producing oxygen using an air separation unit integrated with a gas turbine-driven air compression system which operates using fuel as the primary energy source. Because the method utilizes only expansion turbine-driven compressors, it is particularly useful in remote locations where a fuel such as natural gas is plentiful, capital costs must be minimized, and electric power is not readily available for import. All feed air for the air separation unit is provided by two separate compressors driven by the gas turbine expander wherein one compressor provides air to the air separation unit and to the gas turbine combustor, and the other compressor provides feed air to the air separation unit. This feature allows for a higher degree of flexibility during off-design conditions or during operation below the design oxygen production rate.

The invention also provides improved flexibility in the design of the integrated air separation/gas turbine system. The use of a second air compressor, driven by the gas turbine expander together with the gas turbine air compressor, provides this flexibility. Because the gas turbine air compressor supplies air for both the gas turbine combustor and air separation systems, the selection of a single properly-sized air compressor and expansion turbine from standard commercially-available units may require that one of these units be oversized relative to the other. The gas turbine air compressor could require an oversized expansion turbine if the actual power requirements of a standard air compressor fell between the rated power outputs of commercially available expansion turbines. An oversized expansion turbine operating below design capacity operates inefficiently, and this is obviously undesirable. By using two compressors according to the present invention, a smaller standard expansion turbine could be selected which would operate closer to 100% of its design capacity, and thus operate most efficiently. Stated alternatively, the present invention allows the power requirement for a given air compression duty to be matched more readily with the power output of an available expansion turbine when two air compressors are used rather than a single air compressor.

The essential characteristics of the present invention are described completely in the foregoing disclosure. One skilled in the art can understand the invention and make various modifications without departing from the basic spirit of the invention, and without deviating from the scope and equivalents of the claims which follow.

What is claimed is:

1. A method for the separation of air which comprises:
    (a) compressing ambient air in a first air compressor to provide a first and a second hot pressurized air feed stream;
    (b) compressing ambient air in a second air compressor to provide a third hot pressurized air feed stream;
    (c) combusting fuel with the first hot pressurized air feed stream in a gas turbine combustor, withdrawing therefrom a hot pressurized gas, work expanding the hot pressurized gas in a gas turbine expander, and withdrawing therefrom a gas turbine expander exhaust gas, wherein work produced by the gas turbine expander provides at least a portion of the work required to drive the first and second air compressors;
    (d) combining the second and third hot pressurized air feed streams, cooling the resulting combined hot pressurized air feed stream, and separating the resulting cooled pressurized air feed stream in an air separation system to yield an oxygen-rich product gas and a nitrogen-rich product gas; and (e) heating and work expanding the nitrogen-rich product gas to yield shaft work and a cooled nitrogen-rich product gas.

2. The method of claim 1 which further comprises:

(f) heating the cooled nitrogen-rich product gas to provide a hot nitrogen-rich product gas, generating steam by indirect heat exchange of the hot nitrogen-rich product gas with water, and introducing the steam into the gas turbine combustor.

3. The method of claim 1 wherein the cooling of the resulting combined hot pressurized air feed stream in (d) is provided at least in part by indirect heat exchange with the nitrogen-rich product gas of (d) and the cooled nitrogen-rich product gas of (e).

4. The method of claim 1 which further comprises generating steam by indirect heat exchange of the gas turbine expander exhaust gas with water, and introducing the steam into the gas turbine combustor.

5. The method of claim 2 which further comprises generating steam by indirect heat exchange of the gas turbine expander exhaust gas with water, and introducing the steam into the gas turbine combustor.

6. The method of claim 5 which further comprises introducing liquid water into the gas turbine combustor.

7. The method of claim 1 wherein the shaft work from work expanding the nitrogen-rich product gas in (e) is utilized to compress the oxygen-rich product gas.

8. The method of claim 4 wherein the cooling of the resulting combined hot pressurized air feed stream in (d) is provided at least in part by indirect heat exchange with the nitrogen-rich product gas of (d) to yield the hot nitrogen-rich product gas of (f).

9. The method of claim 1 which further comprises:

(1) compressing air in a third air compressor to provide a fourth and a fifth hot pressurized air feed stream; and (2) combusting fuel with the fourth hot pressurized air feed stream in an additional gas turbine combustor, withdrawing therefrom an additional hot pressurized gas, expanding the additional hot pressurized gas in an additional gas turbine expander, and withdrawing therefrom an additional gas turbine expander exhaust gas, wherein work produced by the additional expansion turbine is used to compress the oxygen-rich product gas of (d).

10. The method of claim 9 which further comprises generating steam by indirect heat exchange of the additional gas turbine expander exhaust gas with water, and introducing the steam into the gas turbine combustor of (c).

11. The method of claim 9 wherein the fifth hot pressurized air feed stream is combined with the resulting combined hot pressurized air feed stream of (d).

12. The method of claim 1 which further comprises:

(1) compressing air in a third air compressor to provide a fourth and a fifth hot pressurized air feed stream; and (2) combusting fuel with the fourth hot pressurized air feed stream in an additional gas turbine combustor, withdrawing therefrom an additional hot pressurized gas, expanding the additional hot pressurized gas in an additional gas turbine expander, and withdrawing therefrom an additional gas turbine expander exhaust gas, wherein work produced by the additional expansion turbine is used to compress the nitrogen-rich product gas of (d).

13. The method of claim 12 which further comprises generating steam by indirect heat exchange of the additional gas turbine expander exhaust gas with water, and introducing the steam into the gas turbine combustor of (c).

14. The method of claim 9 wherein the fifth hot pressurized air feed stream is combined with the resulting combined hot pressurized air feed stream of (d).

15. The method of claim 5 wherein the temperature of the ambient air increases, thereby (1) decreasing the combined mass flow rate of the first and second hot pressurized air feed streams in (a) and (2) decreasing the mass flow of the third hot pressurized air feed streams in (a);

and in response to the increase in ambient air temperature (3) increasing the mass flow rate of the second hot pressurized air feed stream of (a) such that the mass flow rate of the resulting combined pressurized air feed stream of (d) remains constant, (4) increasing the mass flow rate of the fuel in (c), and (5) increasing the mass flow rate of the steam to the gas turbine combustor in (f).

16. The method of claim 6 wherein the temperature of the ambient air increases, thereby (1) decreasing the combined mass flow rate of the first and second hot pressurized air feed streams in (a) and (2) decreasing the mass flow of the third hot pressurized air feed streams in (a);

and in response to the increase in ambient air temperature (3) increasing the mass flow rate of the second hot pressurized air feed stream of (a) such that the mass flow rate of the resulting combined pressurized air feed stream of (d) remains constant, (4) increasing the mass flow rate of the fuel in (c), and (5) increasing the mass flow rate of the liquid water to the gas turbine combustor.

* * * * *